(12) United States Patent
Tsunashima et al.

(10) Patent No.: US 7,460,700 B2
(45) Date of Patent: Dec. 2, 2008

(54) IMAGE PROCESSING METHOD AND COMPUTER-READABLE RECORDING MEDIUM CONTAINING IMAGE PROCESSING PROGRAM

(75) Inventors: Hitoshi Tsunashima, Tokyo (JP); Ayuta Yamada, Tokyo (JP); Hozumi Kanari, Tokyo (JP); Yoshinori Arai, Shojiri (JP)

(73) Assignees: Nihon University, Tokyo (JP); Matsumoto Dental University, Nagano (JP); J. Morita Manufacturing Corporation, Kyoto (JP)

( * ) Notice: Subject to any disclaimer, the term of this patent is extended or adjusted under 35 U.S.C. 154(b) by 165 days.

(21) Appl. No.: 10/565,895

(22) PCT Filed: Jul. 26, 2004

(86) PCT No.: PCT/JP2004/010618

§ 371 (c)(1),
(2), (4) Date: Sep. 1, 2006

(87) PCT Pub. No.: WO2005/009240

PCT Pub. Date: Feb. 3, 2005

(65) Prior Publication Data

US 2007/0009144 A1 Jan. 11, 2007

(30) Foreign Application Priority Data

Jul. 24, 2003 (JP) ............................. 2003-201422

(51) Int. Cl.
*G06K 9/00* (2006.01)
(52) U.S. Cl. ...................... 382/131; 382/154; 382/274; 378/98.4
(58) Field of Classification Search ................. 382/131, 382/274, 154, 107, 128, 161; 348/169; 378/98.4
See application file for complete search history.

(56) References Cited

U.S. PATENT DOCUMENTS 5,297,033 A * 3/1994 Bito et al. .................... 324/309

(Continued)

FOREIGN PATENT DOCUMENTS

JP 07-0000385 1/1995

(Continued)

OTHER PUBLICATIONS

Arai, Y., et al., "Practical Model "3DX" of limited Cone-Beam X-Ray CT for Dental Use" CARS2001, pp. 671-675 (2001).

(Continued)

*Primary Examiner*—Andrew W. Johns
*Assistant Examiner*—Nancy Bitar
(74) *Attorney, Agent, or Firm*—Ladas & Parry, LLP

(57) ABSTRACT

An image processing method which corrects a 3-dimensional CT data value obtained from a 3-dimensional object is provided. The image processing method comprises: a threshold setting step of setting a threshold value used for generating a correction value from the 3-dimensional CT data value obtained from the 3-dimensional object; an average calculating step of calculating an average value of a 3-dimensional CT data block comprising a 3-dimensional CT data element of a correction target and a plurality of 3-dimensional CT data elements in a neighborhood of the 3-dimensional CT data element of the correction target; and a correction step of correcting the 3-dimensional CT data value by using the threshold value set in the threshold setting step and the average value obtained in the average calculating step.

2 Claims, 15 Drawing Sheets

U.S. PATENT DOCUMENTS

| | | | | |
|---|---|---|---|---|
| 5,878,108 | A * | 3/1999 | Baba et al. | 378/98.4 |
| 5,960,058 | A * | 9/1999 | Baba et al. | 378/98.4 |
| 7,068,837 | B2 * | 6/2006 | Befu et al. | 382/154 |
| 7,236,558 | B2 * | 6/2007 | Saito et al. | 378/4 |
| 7,248,725 | B2 * | 7/2007 | Zwirn et al. | 382/128 |
| 2004/0081340 | A1 * | 4/2004 | Hashimoto | 382/128 |
| 2007/0053570 | A1 * | 3/2007 | Tsunashima et al. | 382/131 |
| 2007/0091174 | A1 * | 4/2007 | Kochi et al. | 348/135 |

FOREIGN PATENT DOCUMENTS

| | | |
|---|---|---|
| JP | 09-204513 | 8/1997 |
| JP | 2002-374418 | 12/2002 |
| JP | 2003-061956 | 3/2003 |

OTHER PUBLICATIONS

"Basic Performance of Practical Model "3DX" of Limited Cone-Beam X-Ray CT", Dental Radiology 2000, 40(2), pp. 145-154 (2000).

Befu, S., et al., "A Study on the 3-Dimensional Model Construction Using Ortho-CT", Institute of Electronics, Information and Communication Engineers Technical Research Report MI2000-75, pp. 145-149 (2001).

Befu, S., et al., "A Study in 3-Dimensional Image Processing Method for 3 DX Multi Image Micro CT", CARS2001, pp. 665-670 (2001).

Tsunashima, H., et al., 3-Dimensional Image Construction Method in a Small x-Ray Calculated Tomography for Dental Use, Med Imag. Tech. 21:157-165 (2003.

Arai, Y., et al., "Practical Model "3DX" of Limited Cone Beam X-Ray CT for Dental use", CARS 2001 Computer Assisted Radiology and Surgery, Proceedings of the 15th International Congress and Exhibition, Berlin (Jun. 27-30, 2001).

Arai, Y., et al., "3DX Multi Image Micro CT", Fundamental Efficiency of Limited Cone-Beam X-Ray CT (3DX Multi Image Micro CT), Dental Radiology 2000; 40 (2), pp. 145-154 (2000).

CARS 2001 Computer Assisted Radiology and Surgery, Proceedings of the 15th International Congress and Exhibition, Berlin (Jun. 27-30, 2001).

Befu, S., et al., "A Study on Three Dimensional Modeling of Temporomandibular Joint Based on Ortho-CT image" The Institute of Electronics Infromation and Communication Engineers, pp. 145-149.

Medical Imaging Technology vol. 21, No. 2 (Mar. 2003).

* cited by examiner ical Field

The present invention relates to an image processing method, and a computer-readable recording medium in which an image processing program is recorded.

BACKGROUND ART

In the medical field, the diagnosis using a tomographic image obtained through CT (Computed Tomography) or MRI (Magnetic Resonance Imaging) is commonly performed. With the development of computer hardware technology in recent years, it becomes easy to generate a 3-dimensional image from a tomographic image, and exact and objective grasping of a position and configuration of the affected part is possible. In addition, recently, many researches on a cutting of a splinter of bone, a synthetic simulation and a distance measurement of a skin incision part have been carried out by using the 3-dimensional image.

In the field of dentistry, the CT for medical use has so far been diverted, but it cannot be said that the CT for medical use is optimal for dentistry, from the standpoints of the device scale, the resolution of the image and so on.

To resolve the problem, a 3DX Multi Image Micro CT (which is hereinafter called 3DX device) has been developed by Arai Y et al in the radiology group of the department of dentistry of the Nihon University. See the following documents.

Arai Y, Honda K, Iwai K et al: "Practical Model "3DX" of Limited Cone-Beam X-ray CT for Dental Use", CARS2001, 2001, pp. 671-675.

"Basic Performance of Practical Model "3DX Multi Image Micro CT" of Limited Cone-Beam X-ray CT", Dental Radiology 2000, 40(2), 2000, pp. 145-154.

The photographic area of the 3DX device can be local and the 3DX device itself is configured to reduce the quantity of X-ray radiation as low as possible, and the X-ray exposed dose is reduced with the whole 3DX device.

The range of optical density in the photography area is quantized so that it may be expressed by 256 gradation levels. When compared with the conventional CT data, the 3-dimensional projection data obtained by using the 3DX device have high resolution. It is possible to display a 3-dimensional tomographic image from an arbitrary direction. Detailed observation of a hard tissue of a jawbone or an internal ear which was conventionally difficult to be carried out is also possible. Thereby, the effectiveness in the hard tissue diagnosis in the fields of otolaryngology and dentistry is confirmed.

By using the 3DX device, the present inventors have developed an image processing method which generates a tomographic image by developing a 3-dimensional projection data, obtained by the 3DX device, on two-dimensional images in multiple directions around the Z-axis (or the perpendicular line passing through the center of an object). After performing noise reduction and outline extraction of an object on the tomographic image, this image processing method performs rearrangement of the projection data in the 3-dimensional space. This technique takes into account the fact that the data obtained from the 3DX device are voxel data in the 3-dimensional space.

Next, the outline of the processing will be explained using FIG. 1.

(Extraction of Images)

First, the 3DX device shown in FIG. 1(A) is used to obtain the 3-dimensional projection data as shown in FIG. 1(B), and two-dimensional images are extracted in the multiple directions around the Z-axis from the 3-dimensional projection data as shown in FIG. 1(C). Extraction of images is the reverse algorithm to the method of generating a tomographic image. This extraction is not simply performed at intervals of 0.125 (one voxel) which are the spatial resolution, but the moving-average processing is performed in order to include the noise reduction processing, and the images are extracted so that each image becomes a single image with the average value of eight images in the depth direction of the extraction.

(2-Dimensional Image Processing)

Next, noises are removed from the obtained original images. Since it is difficult to extract the object correctly by the simple binarization processing, the following processing which will be described below is performed and binarized outline images are obtained (FIG. 1(D)).

(1) Contrast adjustment by density conversion
(2) Outline detection using the Gaussian filter
(3) Binarization
(4) Outline extraction by skipping processing (Reconstruction of 3-Dimensional Image)

The obtained outline images are rearranged in the 3-dimensional space for each of the respective directions in the reverse order of the directions in which the images are extracted in the 2-dimensional space, and the 3-dimensional image created for every direction is compounded in the 3-dimensional space (FIG. 1(E)).

At this time, the object areas extracted for the respective directions are different, and the outline information on the missing object can also be interpolated from the image data processed for the other directions.

(Multi-Axial Extraction)

Apart from the manner in which two-dimensional images are extracted in the directions around the Z-axis from the 3-dimensional projection data as shown in FIG. 1(C), there is another method of extraction of two-dimensional images. Namely, two-dimensional images may be extracted along the axes of the lines connecting together the center of each side of one of regular polyhedrons, including a regular tetrahedron (A), a regular hexahedron (B), a regular octahedron (C), a regular dodecahedron (D) and a regular icosahedron (E), shown in FIG. 2, and the center of the one of regular polyhedrons.

It has been confirmed until now that the diagnostic imaging of 5000 cases is performed using the 3DX device and they are effective.

On the other hand, the diagnosis using a 3-dimensional image is demanded for the advancement of dental treatment. The image obtained from the 3DX device has several noises because of its high resolution, and the binarization processing generally used for extraction of a bone area may result in a missing of the object surface and it was very difficult to obtain a 3-dimensional image with good quality of image. As the technique of restoring the missing or cut-off outline, there have been several methods are proposed, such as the method of interpolating the outline smoothly using the curvature of a lacking part or a dispersed point, the method of detecting the outline based on the human vision structure and subjective evaluation, and the interpolation method using the Hough transform. In the field of dentistry, the method of generating a traced drawing based on optimization has been reported.

In addition, Japanese Laid-Open Patent Application No. 2003-061956 discloses an ultrasonic diagnostic device which is configured to generate a high quality 3-dimensional image with a small amount of data. In this device, the volume data in the collection coordinates are divided along the surface defined based on a predetermined sight line direction to generate a plurality of slice data, an intermediate image corresponding to each of a plurality of sliced surfaces is calculated, and accumulation of the intermediate images is carried out so that a display image is generated.

In the cases of the above-mentioned techniques, the detection of a smooth continuation line is possible and their effectiveness is confirmed. However, it is assumed for all the above-mentioned techniques that a lacking part is estimated by using a certain method and it is interpolated by an artificial line.

To obviate the problem, the present inventors have proposed the new technique of extracting an image of an object from the CT data containing several noises and published the fundamental study on the effectiveness in the following documents:

Befu S, Tsunashima H, Arai Y: "A Study on the 3-Dimensional Model Construction Using Ortho-CT", Institute of Electronics, Information and Communication Engineers Technical Research Report MI2000-75, 2001, pp. 145-149

Tsunashima H, Befu S, Arai Y "Stereoscopic Image Construction Method" (Japanese Patent Application No. 2000-358420), 2000

Befu S, Tsunashima H, Arai Y: "A Study in 3-Dimensional Image Processing Method for 3 DX Multi Image Micro CT", CARS2001, 2001, pp. 665-670

Tsunashima H, Befu S, Yamada A, Arai Y: "3-Dimensional Image Construction Method In Small X-ray Calculated Tomography for Dental Use", Med. Imag. Tech. 21:157-165, 2003.

There is known a method for carrying out post-correction processing by choosing automatically a matrix filter which is suited for the image when applying a matrix filter as post-correction processing to the reconstructed image data in a medical image processing device. See Japanese Laid-Open Patent Application No. 07-000385.

Japanese Laid-Open Patent Application No. 09-204518 discloses a method for calculating the accumulated average of 4 neighboring pixels (up/down/right/left), or the accumulated average of 8 neighboring pixels including diagonal pixels, of the target point in the same image with respect to parallel slice data. Also disclosed is a method for calculating the accumulated average of 6 neighboring pixels of a solid body in which 4 neighboring pixels in the same image and the pixels of the same positions in the adjacent image are added, or the accumulated average of 26 neighboring pixels of a solid body in which 8 neighboring pixels in the same image and 3×pixels in the adjacent image are added.

However, the method of this document is related to the slice data correction processing, and there is no teaching in this document of calculating the integrated value of consecutive voxels in a 3-dimensional CT data without changing the 3-dimensional CT data for the correction as in the present invention. Japanese Laid-Open Patent Application No. 2002-374418 discloses a method for performing the processing corresponding to the pixel value, and performing the noise reduction processing and the sharp image processing by a single processing system.

However, the method of this document is related to the smoothing processing in which the low frequency components and the high frequency components are taken into account, and there is no teaching in this document of calculating the integrated value of consecutive voxels in a 3-dimensional CT data without changing the 3-dimensional CT data for the correction as in the present invention.

DISCLOSURE OF THE INVENTION

However, the method disclosed in Japanese Laid-Open Patent Application No. 07-000385 requires preparation of a matrix filter suited for the image in advance. Therefore, in a case of a special image, there is a problem that it is necessary to separately create and prepare a matrix filter suited for the special image.

As for the methods in the above-mentioned documents, it is turned out as a result of examining the reconstructed 3-dimensional image that the image is expanded toward a peripheral direction from the center of rotation of extraction and the size of the object of the reconstructed image is inaccurate.

Accordingly, a general object of the present invention is to provide an image processing method in which the above-mentioned problems are eliminated.

A more specific object of the present invention is to provide an image processing method and a computer-readable recording medium in which an image processing program is recorded which can generate a clear image at high speed using the original image data obtained from CT, without performing estimation of a lacking part.

In order to achieve the above-mentioned objects, the invention as claimed provides an image processing method which corrects a 3-dimensional CT data value obtained from a 3-dimensional object, the image processing method comprising: a threshold setting step of setting a threshold value used for generating a correction value from the 3-dimensional CT data value obtained from the 3-dimensional object; an average calculating step of calculating an average value of a 3-dimensional CT data block comprising a 3-dimensional CT data element of a correction target and a plurality of 3-dimensional CT data element in a neighborhood of the 3-dimensional CT data element of the correction target; and a correction step of correcting the 3-dimensional CT data value by using the threshold value set in the threshold setting step and the average value obtained in the average calculating step.

In order to achieve the above-mentioned objects, the invention as claimed provides an image processing method which processes 3-dimensional CT data obtained from a 3-dimensional object, the image processing method comprising: an integrated value calculating step of calculating an integrated value of a predetermined number of 3-dimensional CT data elements which are consecutive with a currently observed 3-dimensional CT data element being set as a starting point, for each of a plurality of directions with the currently observed 3-dimensional CT data element being set as a starting point; a sum calculating step of calculating a sum of a predetermined number of upper-rank integrated values among respective integrated values calculated for the plurality of directions in the integrated value calculating step; and a judgment step of comparing the sum obtained in the sum calculating step with a predetermined threshold value, and determining the currently observed 3-dimensional CT data element as being data of a processing target when the sum is larger than the threshold value.

In order to achieve the above-mentioned objects, the invention as claimed provides an image processing method which processes 3-dimensional CT data obtained from a 3-dimensional object, the image processing method comprising: an integrated value calculating step of calculating an integrated value of a predetermined number of 3-dimensional CT data elements which are consecutive with a currently observed 3-dimensional CT data element being set as a starting point, for each of a plurality of directions with the currently observed 3-dimensional CT data element being set as a starting point; a sum calculating step of calculating both a sum of a predetermined number of upper-rank integrated values among respective integrated values calculated for the plurality of directions in the integrated value calculating step and a sum of a predetermined number of lower-rank integrated values among the respective integrated values calculated for the plurality of directions in the integrated value calculating step; a correction step of correcting a currently observed 3-dimensional CT data element based on the sum of the predetermined number of upper-rank integrated values and the sum of the predetermined number of lower-rank integrated values; and a judgment step of comparing the corrected 3-dimensional CT data element obtained in the correction step with a predetermined threshold value, and determining the currently observed 3-dimensional CT data element as being data of a processing target when the corrected 3-dimensional CT data element is larger than the threshold value.

In order to achieve the above-mentioned objects, the invention as claimed provides a computer-readable recording medium in which an image processing program embodied therein for causing a computer to execute the image processing method is recorded.

EFFECTS OF THE INVENTION

According to the present invention, it is possible to provide an image processing method and a computer-readable recording medium in which an image processing program is recorded which can generate a clear image at high speed using the original image data obtained from CT, without performing estimation a lacking part, in the processing to correct the 3-dimensional CT data value obtained from the 3-dimensional object.

DESCRIPTION OF REFERENCE NUMERALS

| | |
|---|---|
| 1 | 3DX device |
| 11 | Radiation Source |
| 12 | Detector |
| 13 | Analog-to-digital Converter |
| 14 | General-purpose Computer |
| 21 | Object for Image Pickup |

BEST MODE FOR CARRYING OUT THE INVENTION

A description will now be given of an embodiment of the invention with reference to the accompanying drawings.

Figure 1:
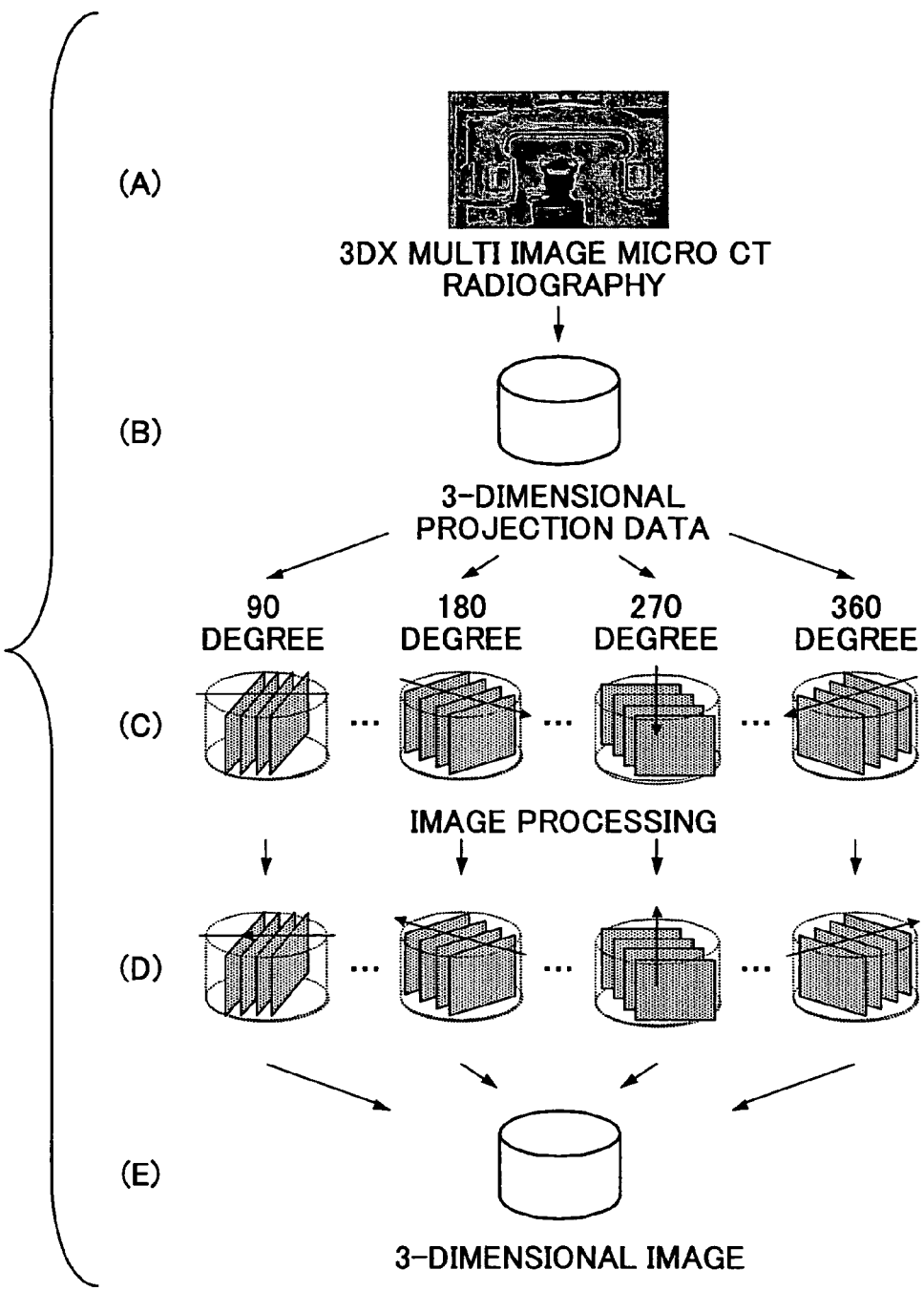
FIG. 1 is a diagram for explaining the processing of a conventional image processing method.
Figure 2:
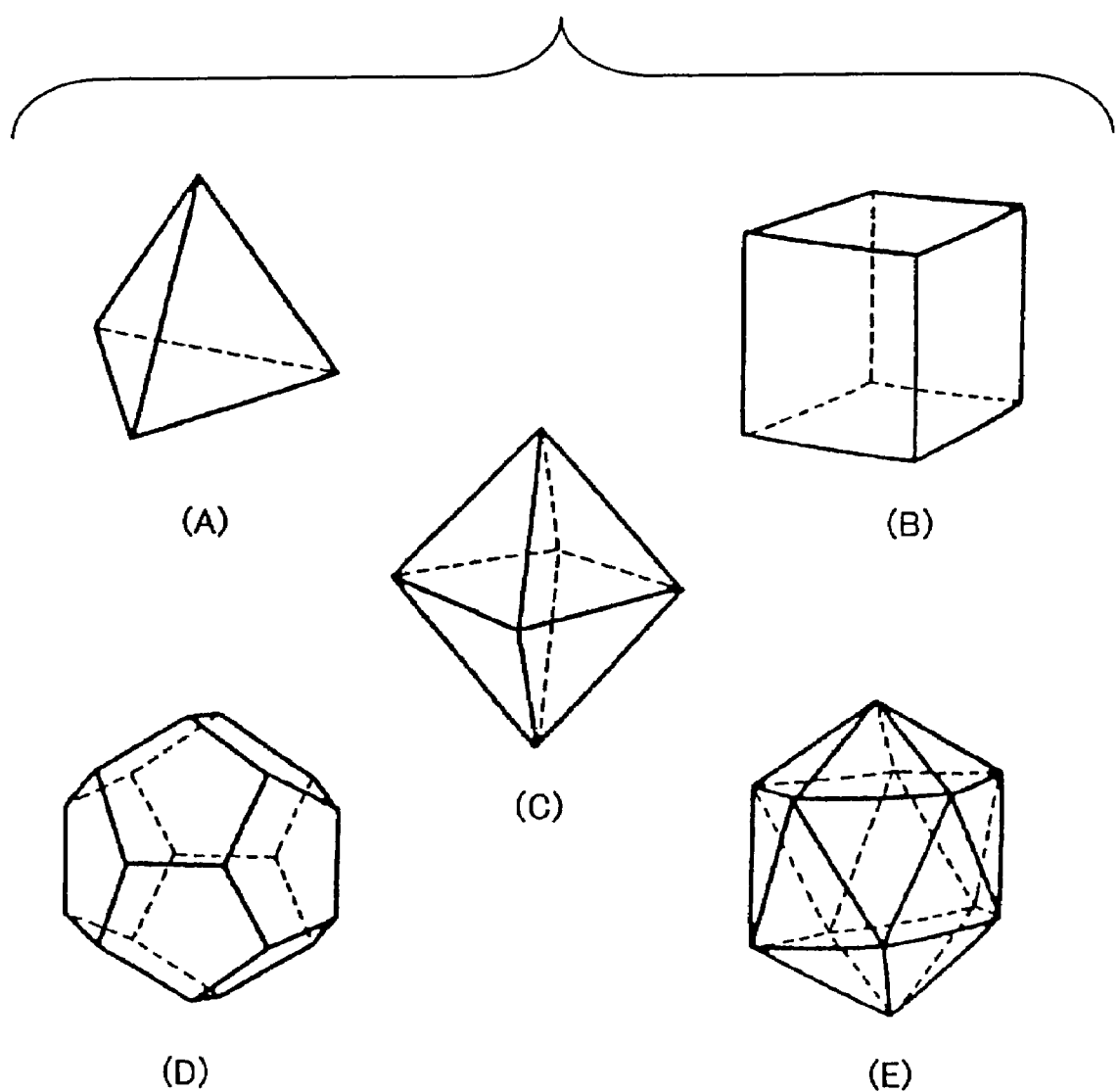
FIG. 2 is a diagram showing a plurality of regular polyhedrons.
Figure 3:
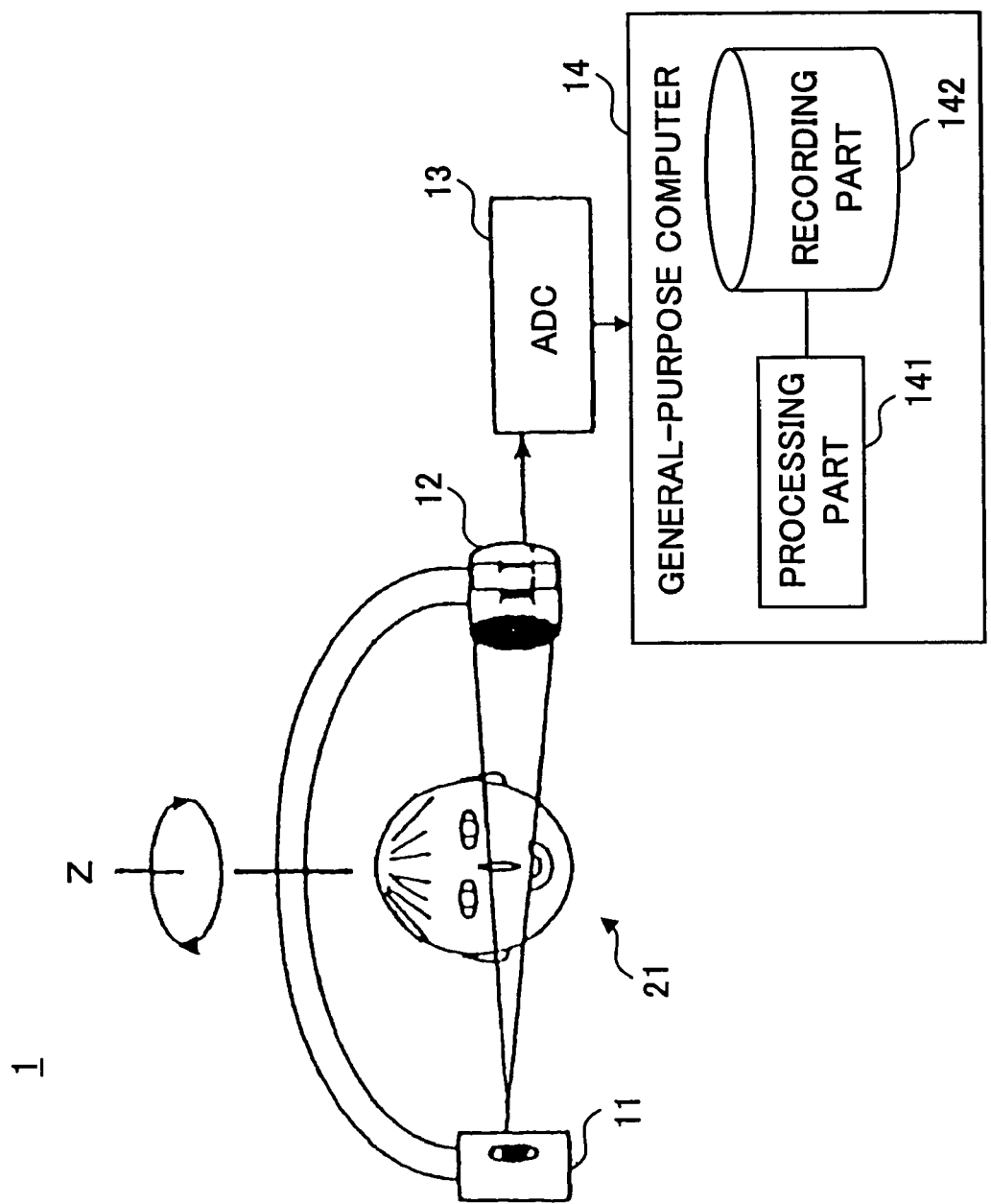
FIG. 3 is a diagram for explaining an example of the 3DX device in which the image processing method of the invention is embodied.

FIG. 3 shows an example of the 3DX device (3DX Multi Image Micro CT Radiography) in which the image processing method of the invention is embodied.

The imaging device 1 is the 3DX device which comprises a radiation (X-ray) source 11, a detector 12, an analog-to-digital converter 13, and a general-purpose computer 14. The radiation source 11 emits a radiation (X-ray), and the radiation emitted from the radiation source 11 is irradiated to the object 21 for image pickup. The radiation emitted from the radiation source 11 passes through the object 21 and inputs to the detector (image intensifier) 12. The detector 12 outputs a detection signal proportional to the intensity of the input radiation.

The general-purpose computer 14 includes a processing part 141 and a recording part 142. In the recording part 142, the image processing program embodied therein for causing the computer to execute the image processing method of the invention is recorded. The processing part 141 is configured to carry out the data processing of data obtained from the analog-to-digital converter 13 in accordance with the image processing program. In addition, the image processing program recorded in the recording medium, such as CD-ROM, CD-R or FDD, may be installed in the recording part 142 of the general-purpose computer 14.

Alternatively, the processing by the analog-to-digital converter 13 may be performed by the processing part 141 of the general-purpose computer 14. In that case, the analog-to-digital converter 13 may be omitted.

The radiation source 11 and the detector 12 are disposed on both sides of the object 21 so as to confront each other, and they are rotated by one revolution around the Z-axis (or the perpendicular line passing through the center of the object) so that a total of 512 pieces of projection data of the object are collected from directions of 360 degrees. The detection signal (analog signal) detected by the detector 12 is supplied to the analog-to-digital converter 13 and converted into digital data. The digital data obtained by the analog-to-digital converter 13 is supplied to the general-purpose computer 14, and the computer 14 performs an image processing of the digital data so that the 3-dimensional image data of the object 21 can be obtained.

Figure 4:
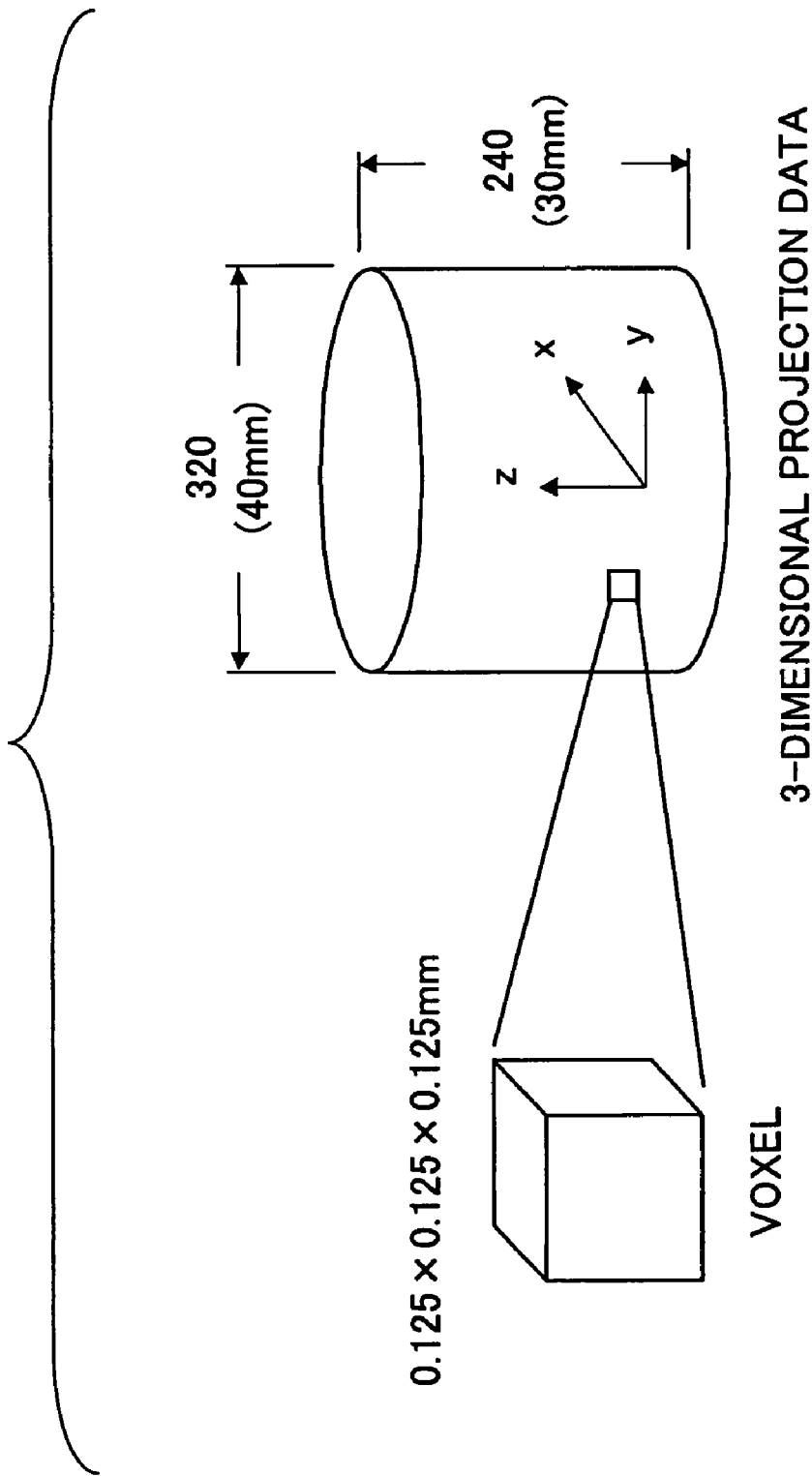
FIG. 4 is a diagram for explaining the 3-dimensional projection data.

The 3-dimensional projection data obtained by the 3DX device has a pillar type image formation area with the height of 30 mm and the diameter of 40 mm as shown in FIG. 4(B). Since one voxel is 0.125×0.125×0.125 as shown in FIG. 4(A), the pillar type image formation area shown in FIG. 4(B) includes voxels of 240×π×(320/2)² in total.

(Density Correction)

In the conventional density correction, the histogram of image is taken into consideration, and the processing to extend the density distribution area of the object is performed (the histogram intensifying method).

Figure 5:
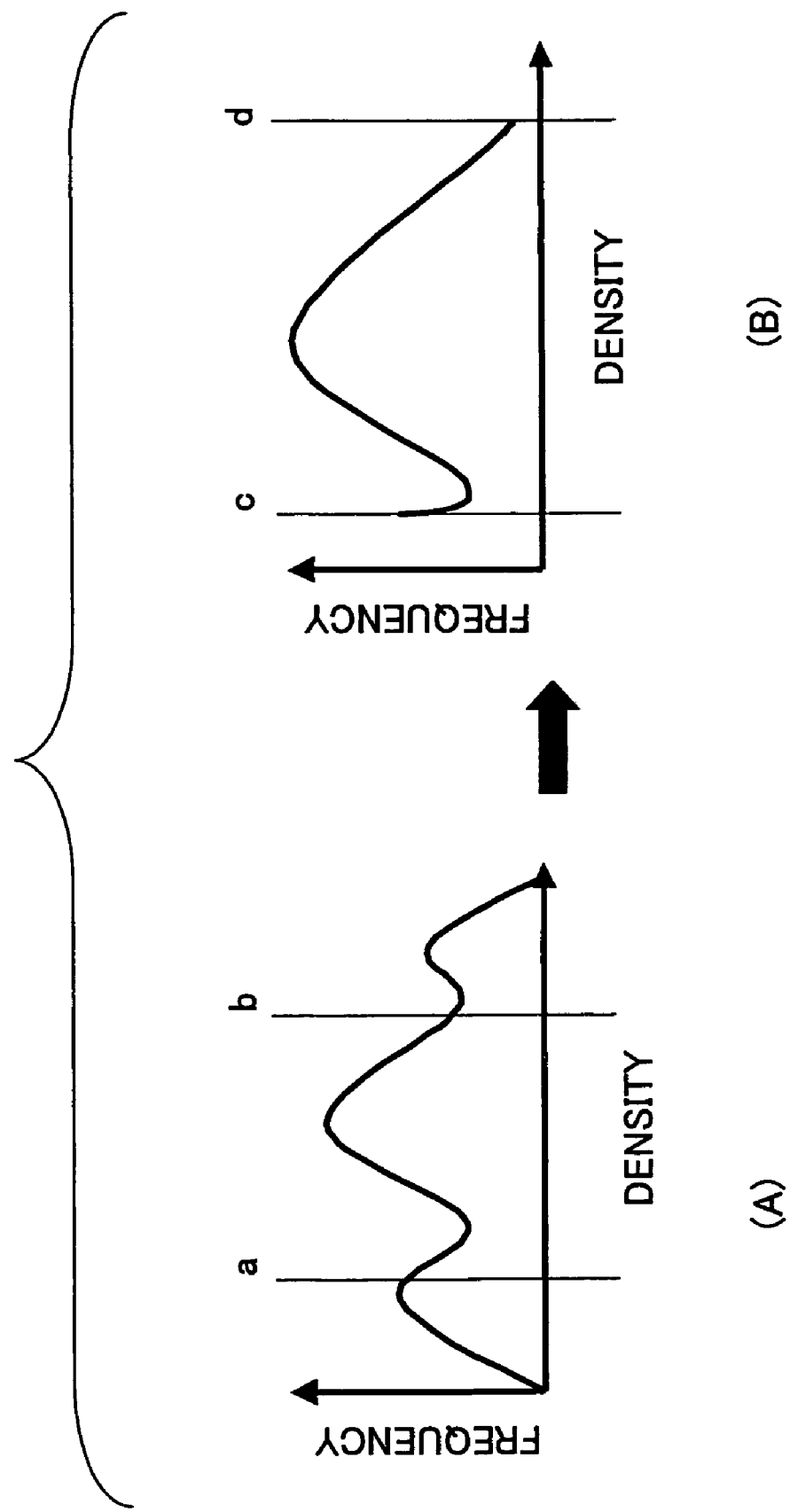
FIG. 5 is a diagram for explaining the histogram intensifying method.

In the case of an image as shown in FIG. 5(A), the histogram intensifying method applies the following formula (6) to the image, and only the histogram in the density value in the range of "a" to "b" is intensified as shown in FIG. 5(B):

$$\text{Pixel}_{out} = (d-c) \times (\text{Pixel}_{in} - a)/(b-a) \qquad (6)$$

where $\text{Pixel}_{in}$ denotes the input pixel value before correction, and $\text{Pixel}_{out}$ denotes the output pixel value after correction.

According to this method, the density value in the range (a, b) containing the outline of a jaw joint is found out, and the density value (a–b) is mapped into the density value (c–d), and partial intensification is performed. For example, the density values ranging from a (=100) to b (=200) are extended to the density values ranging from c (=0) to d (=255).

Figure 8:
FIG. 8 is a diagram showing an original image.
Figure 9:
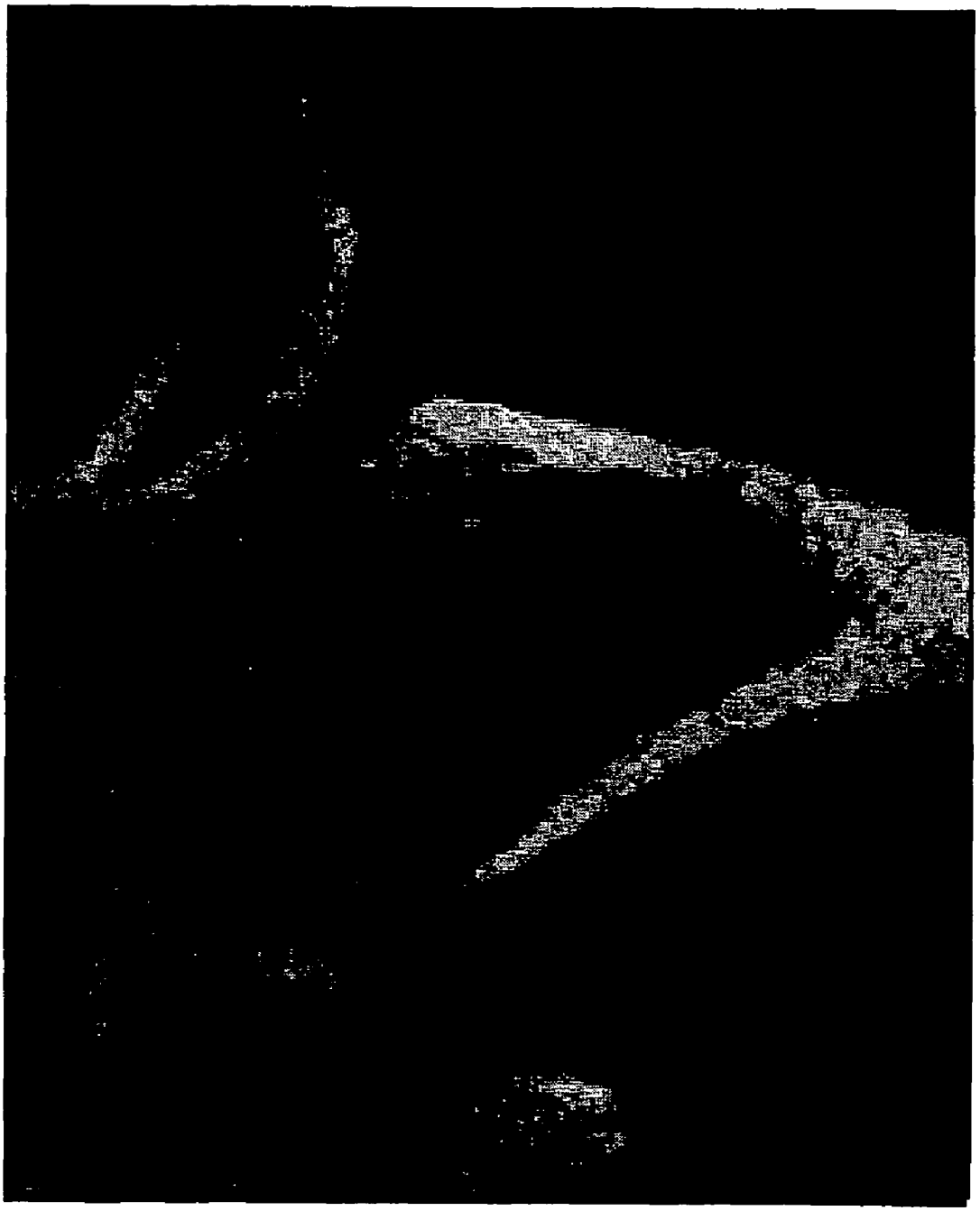
FIG. 9 is a diagram showing an image for which density correction is carried out according to the conventional method.

However, the above method corrects the density using the same processing parameters (a, b, c, d) for all the pixels, and it is difficult to remove all the noises effectively. For example, FIG. 9 shows a case in which the density correction of an image shown in FIG. 8 is performed according to the above method. In the case of FIG. 9, the distribution of density is shown such that the overall density value of the lower half of the image is low (the image is dark) and the density value of the upper half of the image is high (the image is bright). This mean that the density value of the noise component in the upper half of the image differs from the density value of the noise component in the upper half of the image. Thus, it is difficult to remove the noise components distributed over the two areas of the image where the density values differ by using the same processing parameters (a, b, c, d).

The linear density conversion is able to raise the contrast and reduce the noises. However, only the histogram of the whole image is observed and the position information of the object in the image is not taken into consideration. Since the density value of the object varies depending on the position of the image obtained from the 3DX device, the simple linear density correction processing makes the trade-off of the noise component of the object large and causes a limitation of the noise reduction.

In order to eliminate the problem, it is necessary to perform the adaptive density conversion processing in which the parameters are varied adaptively according to every pixel of the 3-dimensional projection data and the position information of the target point in the image is taken into consideration.

In the density correcting method in this embodiment, the processing parameters are changed adaptively according to every pixel of the image, without using the same processing parameters to all the areas of the image, so that the noise component is removed effectively.

(1) First, an optimal threshold value $\text{Thr}_{vol}$ for area division is calculated using the known discrimination analysis method proposed by Ohtsu (the automatic threshold value selecting method based on distinction and least-squares standard, by Ohtsu N, paper '80/4 Vol. J63-D No. 4 from Institute of Electronics and Communication Engineers of Japan, 1980, pp. 349-356) on the 3-dimensional projection data. However, the present invention is not limited to this method, and any other suitable method may be used to set up the optimal threshold value $\text{Thr}_{vol}$.

Figure 6:
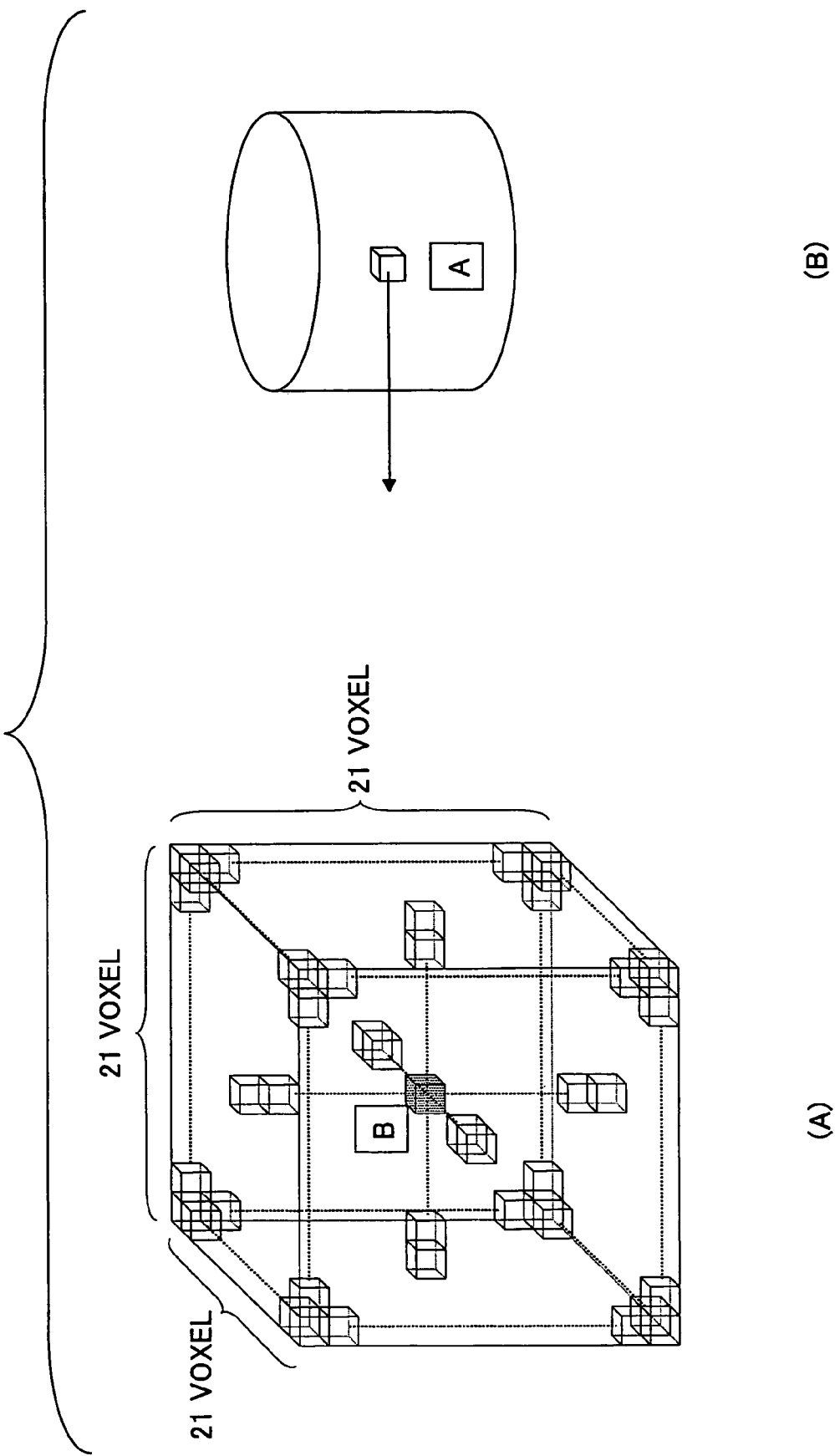
FIG. 6 is a diagram for explaining the neighboring pixels.

(2) Next, an average value $A_{Vn}$ of the neighboring pixels of a target pixel is calculated for every pixel of the image by using the following formula (refer to FIG. 6).

$$Av_n = \frac{1}{N^3} \sum_{x=-\frac{N-1}{2}}^{\frac{N-1}{2}} \sum_{y=-\frac{N-1}{2}}^{\frac{N-1}{2}} \sum_{z=-\frac{N-1}{2}}^{\frac{N-1}{2}} Voxel(x, y, z) \qquad (7)$$

In this case, assuming the value of N is set to 21, the average value of 21×21×21 neighboring pixels of the target pixel (Voxel (x, y, z)) is calculated. Alternatively, the value of N may be set to 27 or others.

Subsequently, the average value of the neighboring pixels is independently calculated for every pixel, and the following correction processing is performed in accordance with the formulas:

$$\text{Voxel}_{out} = \text{Voxel}(x,y,z) - \text{Thr}_{vol}(\text{Thr}_{vol} > A_{Vn}) \qquad (8)$$

$$\text{Voxel}_{out} = \text{Voxel}(x,y,z) - Avn(\text{Thr}_{vol} < AVn) \qquad (9)$$

where $\text{Voxel}_{out}$ denotes the output pixel value after correction.

(Modification of Discrimination Processing)

(1) An average value A of the whole 3-dimensional CT data obtained from the 3DX device is calculated.

(2) A threshold value $\text{Thr}_{vol}$ for generating a correction value is set up from the average value A of the whole CT data in accordance with the formula:

$$\text{Thr}_{vol} = k1 \times A \qquad (10)$$

where $0 < k1 =< 1$. The optimal value of k1 is set up beforehand based on the past data. Alternatively, the optimal value of k1 may be set up on respective occasions of the image processing concerned.

(3) Next, an average value $A_{VN}$ of the neighboring pixels is calculated for every pixel by using the above-mentioned formula (7).

(4) Discrimination processing

The two methods for the discrimination processing will be explained.

(4-1) A difference C between the average value $A_{VN}$ of the neighboring pixels and the average value A of the whole CT data is calculated in accordance with the formula:

$$A_{VN} - A = C \qquad (11).$$

The difference C is set as the amount of density correction and the density (the output pixel value) is corrected using the following formula:

$$\text{Voxel}_{out} = \text{Voxel}_{in} - C \qquad (12)$$

where Voxel$_{in}$ denotes the input pixel value before correction, and Voxel$_{out}$ denotes the output pixel value after correction.

(4-2)

a) In the case of A>A$_{VN}$, a difference C between the average value A$_{VN}$ of the neighboring pixels and the average value A of the whole CT data is calculated in accordance with the formula:

$$A_{VN} - A = C \quad (13)$$

The difference C is set as the amount of density correction and the density (the output pixel value) is corrected using the following formula:

$$Voxel_{out} = Voxel_{in} - C \quad (14)$$

where Voxel$_{in}$ denotes the input pixel value before correction, and Voxel$_{out}$ denotes the output pixel value after correction. In this case, the density value is corrected so as to be increased (the image becomes bright).

b) In the case of A$_{VN}$>A, the density value is outputted without being corrected as in the following formula:

$$Voxel_{out} = Voxel_{in} \quad (15).$$

In this case, the bright image is outputted without being corrected.

Figure 7:
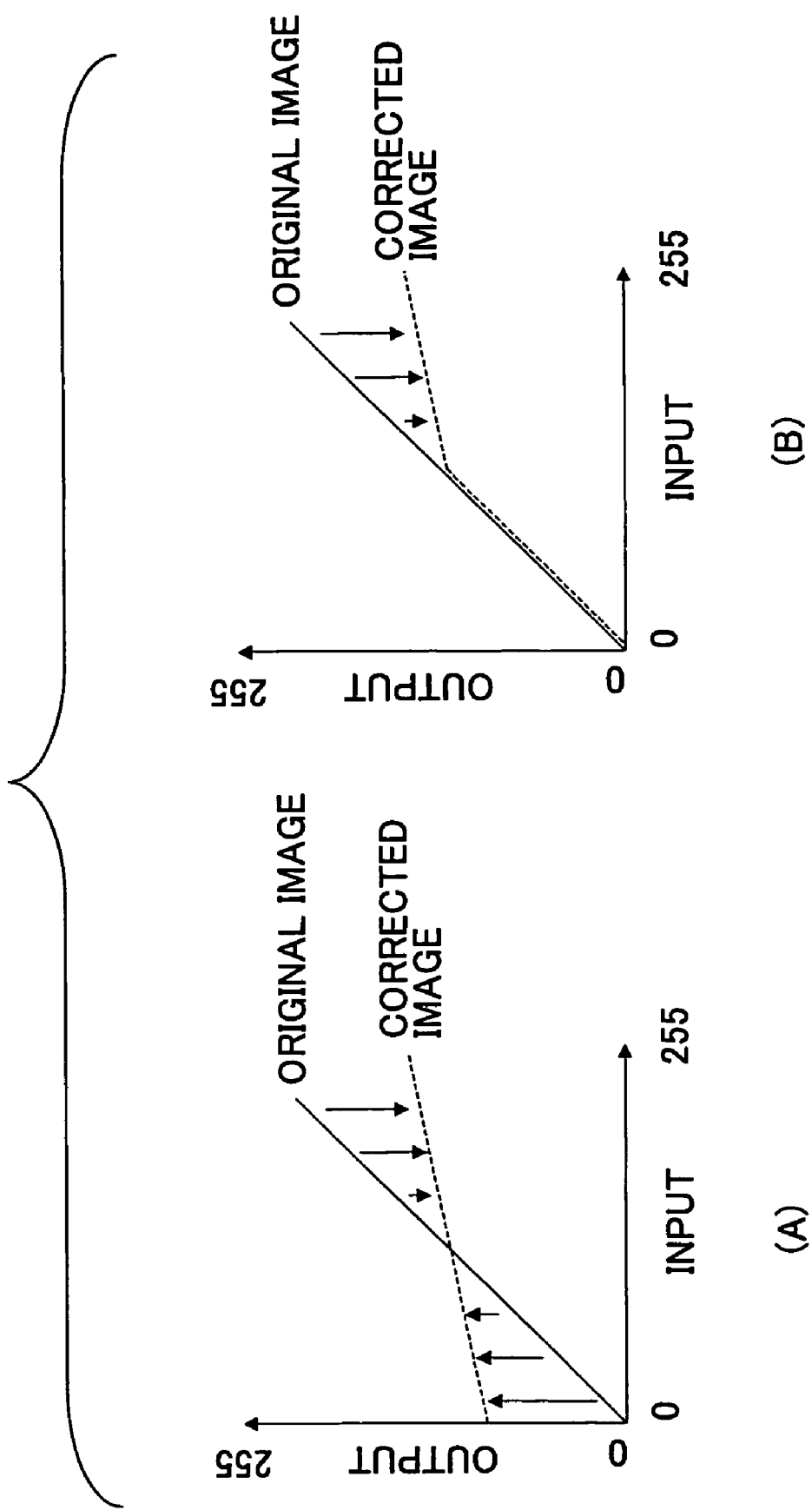
FIG. 7 is a diagram for explaining the comparison in the discrimination processing.

In the method of (4-2) mentioned above, when A<A$_{VN}$, the processing by which the image becomes dark is not performed as shown in FIG. 7(B). In the method of (4-1) mentioned above, when A<A$_{VN}$, the processing by which the image becomes dark is performed as shown in FIG. 7(A).

This processing makes it possible to reduce the variation in the position of a noise component in the density value distribution by carrying out the discrimination processing of the information on the whole image and the information (in this case, the average value) on the position of a local area in the image.

Figure 10:
FIG. 10 is a diagram showing an image for which density correction is carried out according to the image processing method of this embodiment.

FIG. 10 shows a density correction which is performed in accordance with the method of density correction in this embodiment.

The example of FIG. 10 is compared with the example of FIG. 9. It is found that the method of density correction in this embodiment makes it possible to remove the noise component (or the misty part in the upper left portion) in the proximity part of a mandible head or a mandibular fossa. This is because the average value of the density in the neighborhood of the proximity part is larger than the optimal threshold value according to the discrimination analysis method and the resulting image may become sensitive to the change in the density of the neighboring area of the target point.

On the other hand, in the area of the background of the image or the area within the object, the average value of the density in the neighborhood of the proximity part is smaller than the optimal threshold value according to the discrimination analysis method.

For this reason, the method of density correction in this embodiment is the processing which uses the information obtained from the density distribution of the whole 3-dimensional projection data, and it is possible to remove efficiently the fixed density value area which regularly exists in the 3-dimensional projection data.

The density correction method of this embodiment is the adaptive density conversion processing in which the parameters are varied adaptively according to every pixel of the 3-dimensional projection data while the information on the whole image in the 3-dimensional space is compared with the information on the local area of the image centering on the target point. Thereby, the density value of the area with a low density value in the whole image can be converted into a fixed density value, and the density value of the area with a high density value is converted using the parameter which depends on the information of the peripheral portion of the target point strongly. It is possible that the density correction method of this embodiment make the whole image good subjectively.

(Detection of Boundary Plane)

It is determined whether each pixel of the 3-dimensional CT data obtained from the 3DX device is a part of a boundary point or boundary plane.

Figure 11:
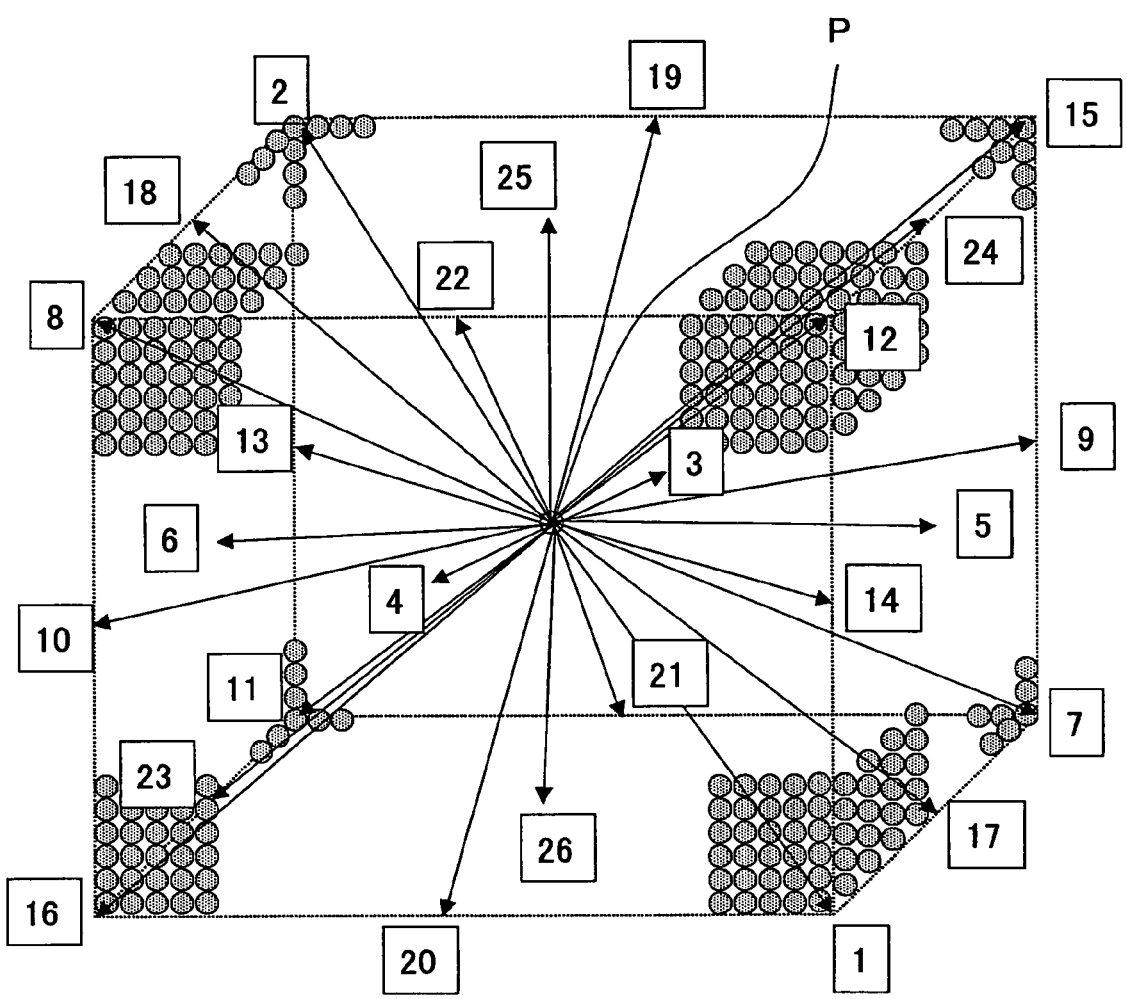
FIG. 11 is a diagram (No. 1) for explaining the 26 directions.
Figure 12:
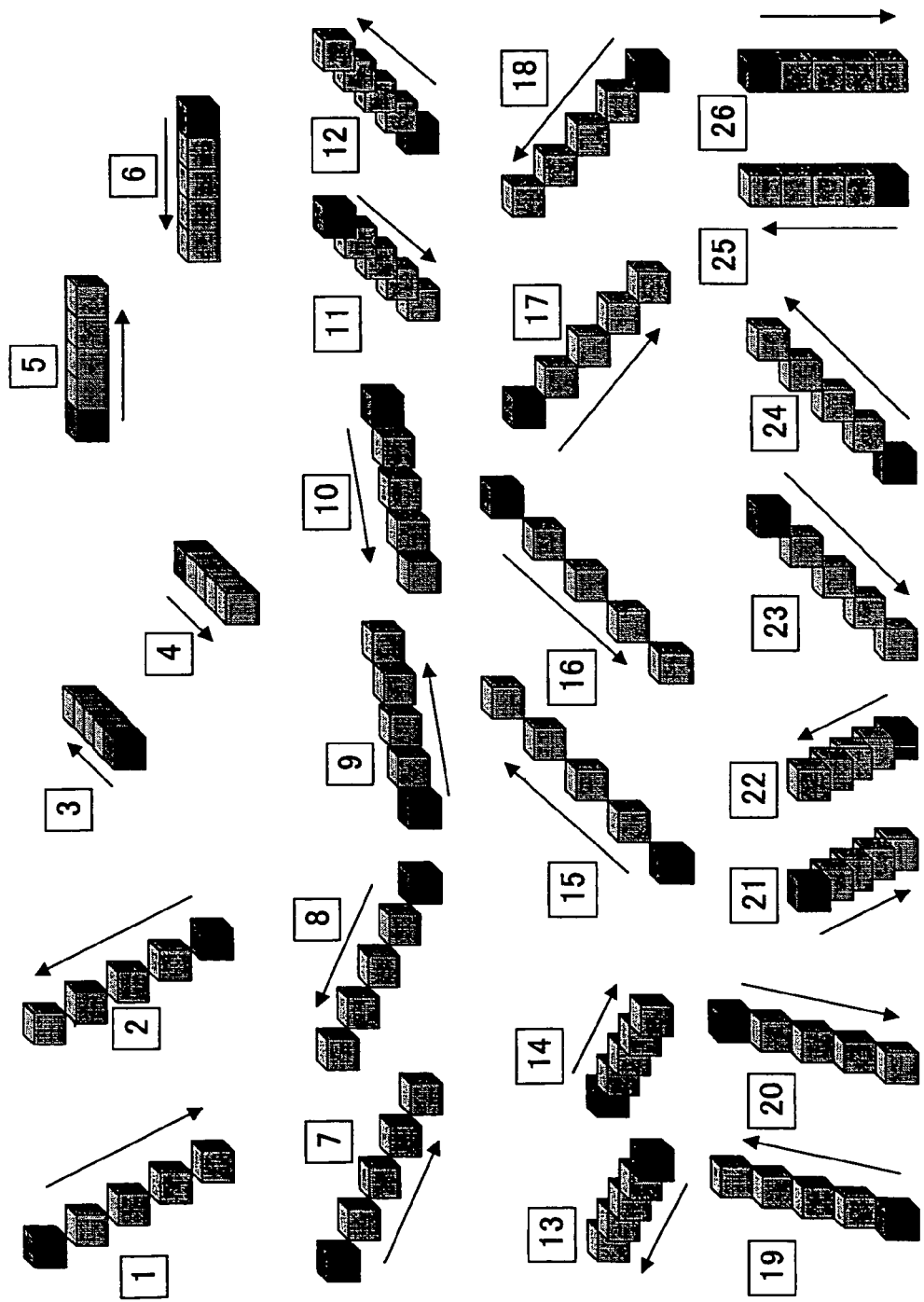
FIG. 12 is a diagram (No. 2) for explaining the 26 directions.

(1) The 26 directions which are shown in FIG. 11 and FIG. 12 are set up from a target point of the 3-dimensional CT data.

The 26 directions shown in FIG. 11 and FIG. 12 are set up as in the following, supposing the cube which has the center placed at the target point P of the 3-dimensional CT data:

(a) The 8 directions (1, 2, 7, 8, 11, 12, 15, 16) corresponding to the eight corners of the cube are set up from the target point P of the 3-dimensional CT data;

(b) The 12 directions (9, 10, 13, 14, 17, 18, 19, 20, 21, 22, 23, 24) corresponding to the middle points of the 12 sides of the cube are set up from the target point P of the 3-dimensional CT data; and (c) The 6 directions (3, 4, 5, 6, 25, 26) corresponding to the centers of the 6 surfaces of the cube are set up from the target point P of the 3-dimensional CT data.

The present invention is not limited to this embodiment, and the processing directions may be set up from the target point P of the 3-dimensional CT data in a different manner. For example, the directions corresponding to the centers of respective surfaces of a regular polygon may be set up. Moreover, addition of other directions or deletion of any of the directions shown in FIG. 11 may be made.

(2) The 4 voxels are pursued for every direction of the 26 directions, and a pixel value of each one is accumulated (curvilinear integral) for all the 26 directions. The sums f[0]–f[25] of the pixel values are calculated for the 26 directions. The number of curvilinear integrals which can be carried out is not limited to 4.

(3) The sums f[0]–f[25] for the 26 directions are rearranged in a descending order. An average value of the pixel values of the 8 upper-rank sums thereof is calculated after rearrangement.

Although the average value of the pixel values of the 8 upper-rank sums is calculated in this embodiment, the present invention is not limited to this embodiment. For example, a sum of the pixel values of the 8 upper-rank sums may be calculated respectively so that a total of such sums may be calculated.

In this case, the currently observed 3-dimensional CT data element is set as a starting point, and an integrated value of a predetermined number of consecutive 3-dimensional CT data elements is calculated for each of a plurality of directions with the currently observed 3-dimensional CT data element being set as the starting point. And a sum of a predetermined number of upper-rank integrated values among respective integrated values calculated for the plurality of directions is calculated.

(4) When the average value for the eight directions is larger than a predetermined threshold value, it is determined that this pixel is the information on a part of the object, and the image is outputted.

This threshold value Thr$_F$ is set up based on average value F$_{AV}$ of the sums f[0]–f[25] and the maximum value F$_{MAX}$ of the sums f[0]–f[25]. For example, the threshold value Thr$_F$ is calculated in accordance with the following formula:

$$Thr_F = k2 \times (F_{MAX} - F_{AV}) \quad (16)$$

where k2 is a constant value.

According to this method, the edge of the image becomes clear.

Alternatively, a difference between an average value of the pixel values of the 8 upper-rank sums and an average value of the pixel values of the 8 lower-rank sums may be calculated, and the pixel value of the target point is corrected based on the difference, and when the corrected value is larger than a predetermined threshold value, the target point is determined as being a part of a boundary plane.

That is, the average value of the pixel values of the 8 upper-rank sums is set to F8max, the average value of the pixel values of the 8 lower-rank sums is set to F8min, and the value Voxel of the target point of the 3-dimensional CT data is corrected based on the difference between F8max and F8min, and it is determined whether it is regarded as the information on a part of the object based on the correction value.

The average value may be calculated by dividing the sum of the pixel values for the 8 directions by 8. If the divisor is regarded as a fixed value, the sum of the pixel values for the 8 directions may be considered as the average value.

Specifically, an intensified correction value Voxel_e is calculated from the value Voxel of the target point of the 3-dimensional CT data in accordance with the following formula (17) using an intensifying coefficient k3 (0<k3):

$$\text{Voxel\_}e = \text{Voxel} + k3(F8\ \text{max} - F8\ \text{min}) \quad (17).$$

It is determined whether it is regarded as the information on a part of the object, depending on whether the intensified correction value Voxel_e is larger than a predetermined threshold value.

In the above embodiment, the average values F8max and F8min are calculated. Alternatively, a sum of the pixel values of the 8 upper-rank sums and the pixel values of the 8 lower-rank sums may be calculated instead.

In this case, a sum of a predetermined number of upper-rank integrated values among respective integrated values calculated for the plurality of directions and a sum of a predetermined number of low-rank integrated values among the respective integrated values calculated for the plurality of directions are calculated. The currently observed 3-dimensional CT data element is corrected based on the sum of the predetermined number of upper-rank integrated values and the sum of the predetermined number of low-rank integrated values. The corrected 3-dimensional CT data element is compared with the predetermined threshold value, and it is determined based on a result of the comparison whether the currently observed 3-dimensional CT data element is the data of a processing target.

When the target point of the 3-dimensional CT data is exactly on the boundary of the surface, the F8max is large and the F8min is small, and the value of (F8max−F8min) is large. Therefore, based on the intensified correction value Voxel_e obtained by the formula (16), the determination as to whether it is on a boundary plane can be made adequately accurate.

This technique is the processing in which a characteristic point is extracted from the 9×9×9 areas centered on the target point with respect to the 4 voxels for all the directions. The load complexity of the computations for extracting a characteristic point from the 9×9×9 areas is heavy, and there is a problem in the processing time.

However, in the above-described processing, the curvilinear integrals of the vectors for 26 directions are calculated from the target point, and they are rearranged (rearrangement) so that a characteristic point is extracted. It is possible to perform the computations very efficiently.

(Image Processing Method)

Figure 13:
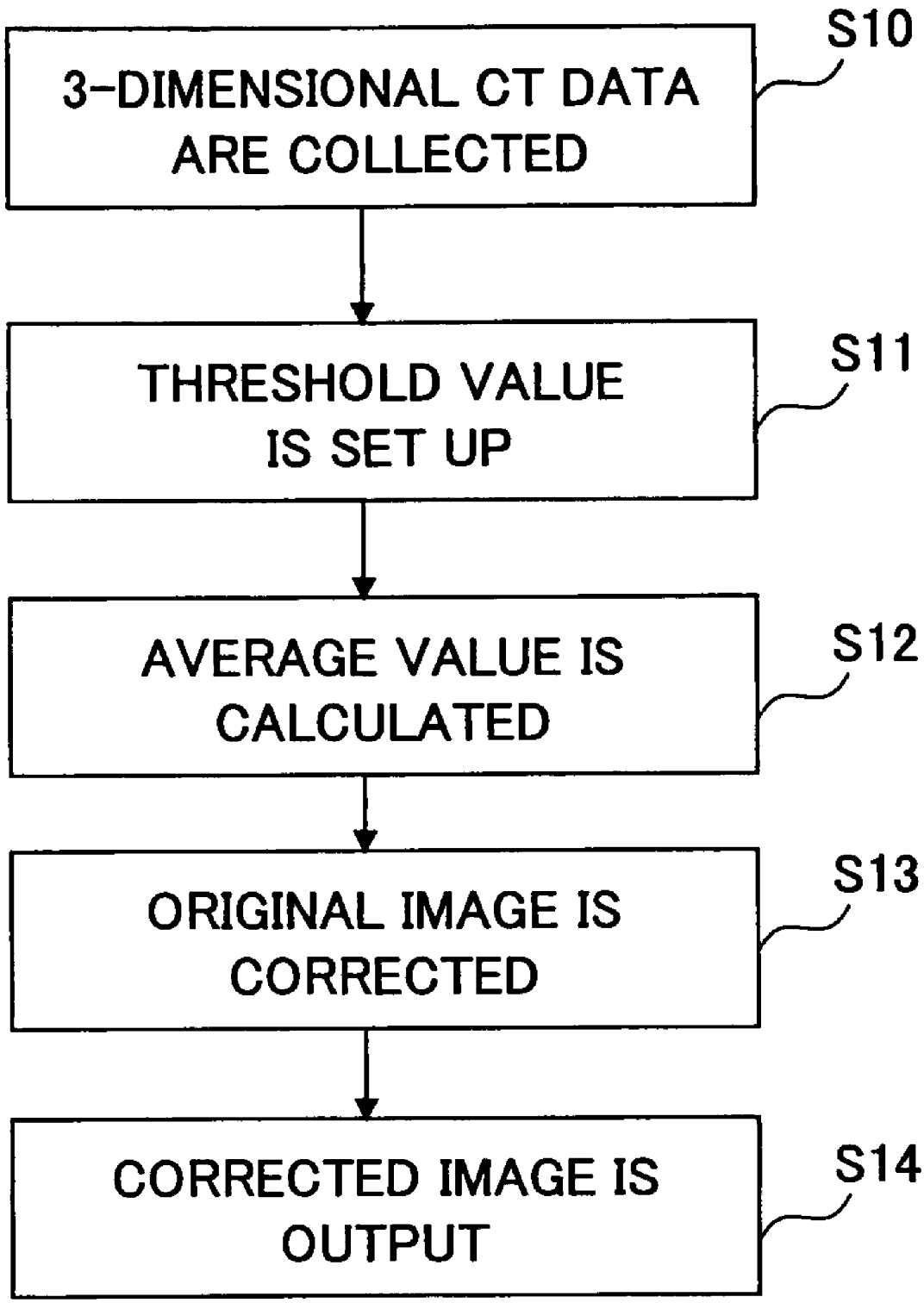
FIG. 13 is a flowchart for explaining the image processing method which corrects the 3-dimensional CT data value obtained from the 3-dimensional object.

FIG. 13 is a flowchart for explaining the image processing method which corrects the 3-dimensional CT data value obtained from the 3-dimensional object.

First, the 3DX device collects the 3-dimensional CT data by rotating the 3-dimensional object around a predetermined axis by one revolution (S10).

Subsequently, the threshold value used for generating a correction value is set up from the 3-dimensional CT data obtained from the 3-dimensional object (S11). For example, in this step, the threshold value is set up in accordance with on the automatic threshold value selecting method based on the least-squares standard proposed by Ohtsu, or in accordance with the above formula (10).

Subsequently, the average value of a 3-dimensional CT data block comprising a 3-dimensional CT data element of a correction target and a plurality of 3-dimensional CT data elements in a neighborhood of the 3-dimensional CT data element of the correction target is calculated (S12). Namely, the average value $A_{Vn}$ of the neighboring pixels is calculated for every pixel in accordance with the formula (7).

The 3-dimensional CT data value is corrected by using the threshold value set in the threshold setting step and the average value obtained in the average calculating step (S13). Namely, the values of the 3-dimensional CT data are corrected in accordance with the formulas (1), (2), (3), (4), and (5).

Then, the corrected image is outputted using the corrected 3-dimensional CT data (S14).

Figure 14:
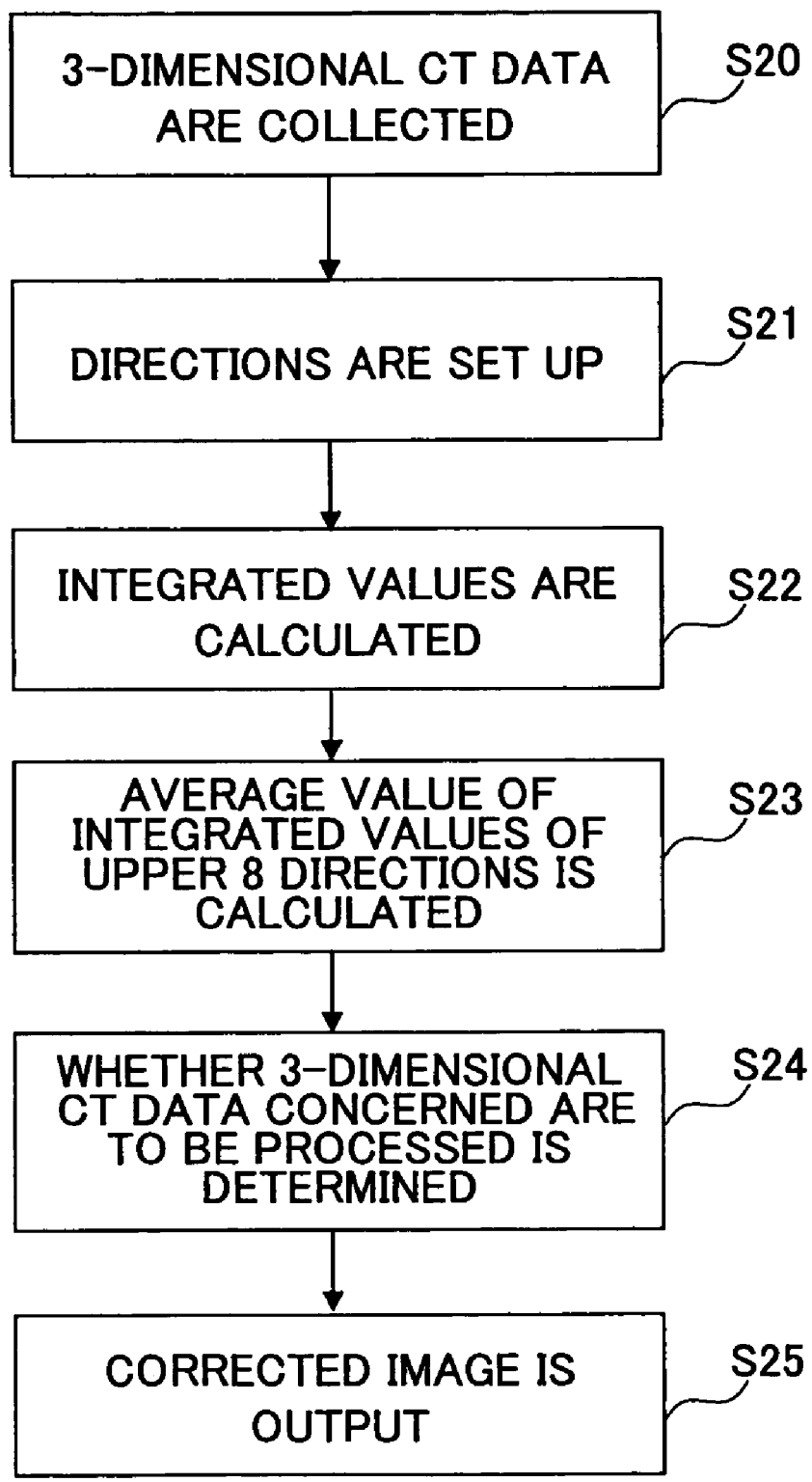
FIG. 14 is a flowchart for explaining the image processing method which determines whether the 3-dimensional CT data currently observed is used as a target data in the 3-dimensional CT data value obtained from the 3-dimensional object.

FIG. 14 is a flowchart for explaining the image processing method which determines whether the 3-dimensional CT data currently observed is used as a target data in the 3-dimensional CT data obtained from the 3-dimensional object.

First, the 3DX device collects a total of 512 pieces of 3-dimensional projection data from the directions of 360 degrees by rotating the 3-dimensional object around a predetermined axis by one revolution (S20).

Subsequently, a plurality of directions are set up with the currently observed 3-dimensional CT data element being set as a starting point (S21). For example, the 26 processing directions shown in FIG. 11 and FIG. 12 are set up from the target point of the 3-dimensional CT data).

Subsequently, an integrated value of a predetermined number of 3-dimensional CT data elements which are consecutive with the currently observed 3-dimensional CT data element being set as the starting point is calculated for each of the plurality of directions (S22). For example, the 4 voxels are pursued for each of the plurality of directions and a pixel value of each one is accumulated (curvilinear. integral). The sums f[0]–f[25] for the 26 directions are calculated.

Subsequently, the sums f[0]–f[25] for the 26 directions are rearranged in a descending order. An average value of the pixel values of the 8 upper-rank sums is calculated after rearrangement (S23).

Subsequently, it is determined whether the currently observed 3-dimensional CT data element is used as a target data (S24). For example, the average value calculated at the step S23 is compared with a predetermined threshold value, and when it is larger than the predetermined threshold value, the currently observed 3-dimensional CT data is the data of a processing object.

Then, the corrected image is outputted using the corrected 3-dimensional CT data (S25).

Figure 15:
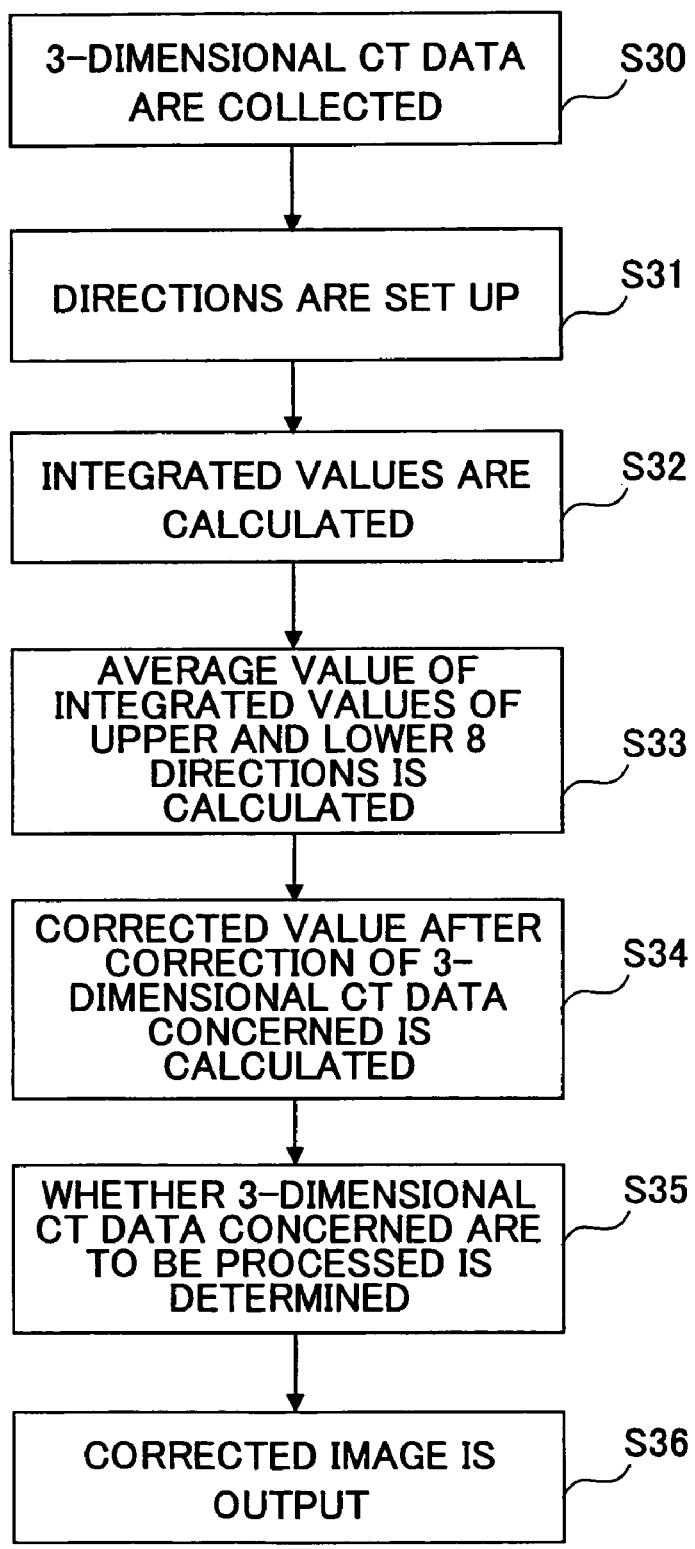
FIG. 15 is a flowchart for explaining the image processing method in which a difference between an average value of the pixel values of the 8 upper-rank sums and an average value of the pixel values of the 8 lower-rank sums is calculated, and the 3-dimensional CT data value is corrected based on the difference, and when the corrected value is larger than a threshold value, it is regarded as a boundary plane.

FIG. 15 is a flowchart for explaining the image processing method in which a difference between an average value of the pixel values of the 8 upper-rank sums and an average value of the pixel values of the 8 lower-rank sums is calculated, the 3-dimensional CT data value is corrected based on the difference, and when the corrected value is larger than a predetermined threshold value, it is regarded as a boundary plane.

First, the 3DX device collects a total of 512 pieces of 3-dimensional projection data from the directions of 360 degrees by rotating the 3-dimensional object around a predetermined axis by one revolution (S30).

Subsequently, a plurality of directions are set up with the currently observed 3-dimensional CT data element being set as a starting point (S31). For example, the 26 directions shown in FIG. 11 and FIG. 12 are set up from the target point of the 3-dimensional CT data.

Subsequently, an integrated value of of a predetermined number of 3-dimensional CT data elements which are consecutive with the currently observed 3-dimensional CT data element being set as the starting point is calculated for each of the plurality of directions (S32). For example, the 4 voxels are pursued for each of the plurality of directions and a pixel value of each one is accumulated (curvilinear integral). The sums f[0]–f[25] for the 26 directions are calculated.

Subsequently, the sums f[0]–f[25] for the 26 directions are rearranged in a descending order. After the rearrangement, an average value of the pixel values of the 8 upper-rank sums and an average value of the pixel values of the 8 lower-rank sums are calculated (S33). An intensified correction value Voxel_e is calculated from the value Voxel of the target point of the 3-dimensional CT data in accordance with the above formula (16) (S34).

Subsequently, based on the intensified correction value Voxel_e, it is determined whether the currently observed 3-dimensional CT data is used as a target data (S35). For example, when the correction value is larger than a predetermined threshold value, the currently observed 3-dimensional CT data is data of a processing target.

Then, the corrected image is outputted using the corrected 3-dimensional CT data (S36).

According to this embodiment, it is possible to effectively reduce the noise component in the density value distribution by carrying out, at the time of density conversion, the discrimination processing of the information on the whole image and the information on the position of the local area in the image. The noise reduction in a proximity part of an articular cavity or the like is especially remarkable.

According to this embodiment, the processing is performed by using the original image data obtained from the CT without converting them into two dimensional data, and high-speed processing is possible.

APPLICABILITY OF THE INVENTION

This invention is applicable to limited cone-beam X-ray CT devices for dental and head/neck part uses or the like.

The invention claimed is:

1. An image processing method which processes 3-dimensional CT data obtained from a 3-dimensional object, comprising:
    an integrated value calculating step of calculating an integrated value of a predetermined number of 3-dimensional CT data elements which are consecutive with a currently observed 3-dimensional CT data element being set as a starting point, for each of a plurality of directions with the currently observed 3-dimensional CT data element being set as a starting point;
    a sum calculating step of calculating both a sum of a predetermined number of upper-rank integrated values among respective integrated values calculated for the plurality of directions in the integrated value calculating step and a sum of a predetermined number of lower-rank integrated values among the respective integrated values calculated for the plurality of directions in the integrated value calculating step;
    a correction step of correcting a currently observed 3-dimensional CT data element based on the sum of the predetermined number of upper-rank integrated values and the sum of the predetermined number of lower-rank integrated values; and
    a judgment step of comparing the corrected 3-dimensional CT data element obtained in the correction step with a predetermined threshold value, and determining the currently observed 3-dimensional CT data element as being data of a processing target when the corrected 3-dimensional CT data element is larger than the threshold value.

2. A computer-readable recording medium in which an image processing program embodied therein for causing a computer to execute the image processing method according to claim 1 is recorded.

* * * * *